H. C. SNYDER, Jr.
DUAL POWER TRANSMISSION FOR CYCLE BARS OF MOWING MACHINES.
APPLICATION FILED MAY 21, 1919.

1,313,961.

Patented Aug. 26, 1919.

Inventor
H. C. Snyder Jr.
By Watson E. Coleman
Attorney

UNITED STATES PATENT OFFICE.

HENRY C. SNYDER, JR., OF EFFINGHAM, KANSAS.

DUAL-POWER TRANSMISSION FOR CYCLE-BARS OF MOWING-MACHINES.

1,313,961.  Specification of Letters Patent.  Patented Aug. 26, 1919.

Application filed May 21, 1919. Serial No. 298,611.

*To all whom it may concern:*

Be it known that I, HENRY C. SNYDER, Jr., a citizen of the United States, residing at Effingham, in the county of Atchison and State of Kansas, have invented certain new and useful Improvements in Dual-Power Transmission for Cycle-Bars of Mowing-Machines, of which the following is a specification, reference being had to the accompanying drawings.

This invention relates to a dual power or variable speed transmission for cycle bars of mowing machines.

Heretofore, only a single speed transmission has been utilized for operating the cutting bar of a mowing machine, when mowing thick and thin hay and the like, and it has been found when the hay or other material is growing thick and heavy, the cutting bar will be more apt to become clogged, thereby rendering inefficient results.

Therefore, it is an object of the present invention to provide a variable speed or dual power transmission mechanism, capable of being manually manipulated, in order to impart slow reciprocating movements to the cutting bar, when the hay or the like is more or less thin, and then capable of being manually manipulated to impart rapid reciprocating movements to the cutting bar, when it is discovered the hay or the like is growing more or less thick, thereby rendering more efficient results during the mowing operations.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 1:
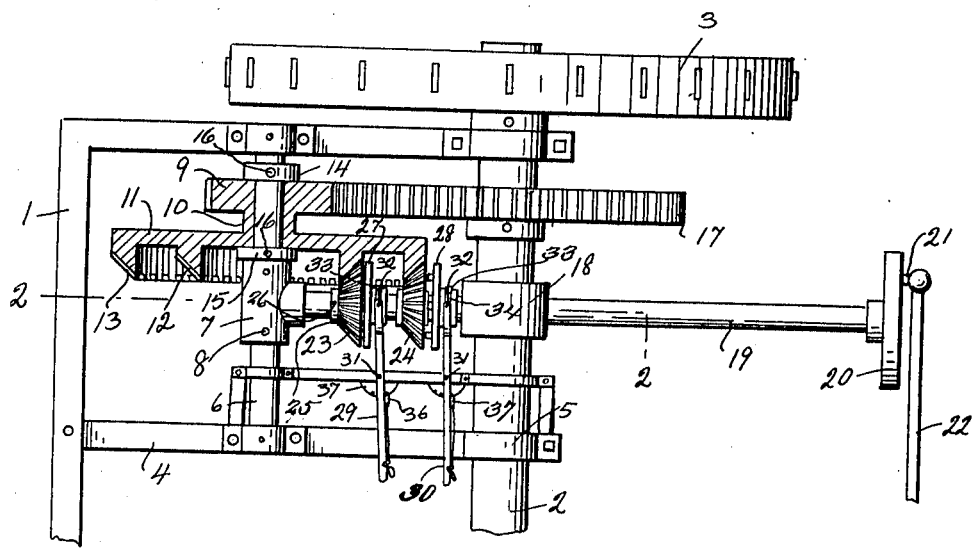
Figure 1 is a plan view of the variable speed mechanism, for transmitting dual speed to the cutting bar of a mowing machine.
Figure 2:
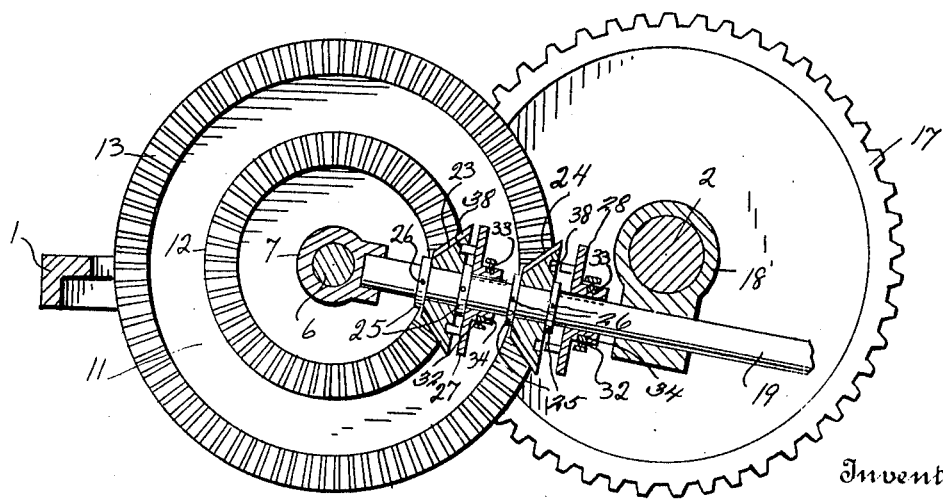
Fig. 2 is a sectional view on line 2—2 of Fig. 1.

Referring more especially to the drawings, 1 designates a suitable frame, in bearings of which a supporting drive axle 2 is mounted, which is designed to have opposite supporting wheels, only one of which is shown as at 3. An auxiliary frame 4 is carried by the frame 1, and has a bearing 5 for the supporting drive axle 2. A fixed shaft 6 is mounted in bearings of the frame 1 and the auxiliary frame 4, and this fixed shaft carries a member or sleeve 7, which is fixed to the shaft 7 as at 8. Rotatably mounted upon the fixed shaft 6 is a gear 9, the hub 10 of which forms an integral part with the disk 11. One face of this disk is provided with beveled gear teeth 12 and 13, and it is to be noted that the beveled gear teeth 12 are of less diameter than the beveled gear teeth 13. Collars 14 and 15 are secured by pins 16 on the fixed shaft 6, the collar 14 is on one side of the gear 9, while the collar 15 is on one side of the disk 11, and since the disk 11 and the gear 9 are rigid to each other, they rotate together, and are prevented from moving axially on the fixed shaft 6 by the collars 14 and 15. It is to be noted that the supporting drive wheel 3 rotates with the axle 2, and also fixed to rotate with the axle 2 is a gear 17, which the supporting axle 2 is a gear 17, which meshes with the gear 9, and it is obvious that when the supporting drive wheel 3 is rotating, power is transmitted to the gear 9, through the medium of the gear 17, thereby driving the disk 11.

A bearing member 18 is carried by the supporting drive axle 2, which is rotatable in the bearing member 18, and journaled in the bearing member 18 is a shaft 19, one end of which is journaled in the sleeve 7, and the other end is provided with a disk 20, which carries an eccentrically mounted pin 21, to which the pitman 22 (which is designed to be connected to a reciprocating cutter bar, not shown, of a mowing machine, not shown) is pivotally connected, for imparting reciprocating movements to the cutter bar.

Loosely journaled on the revoluble shaft 19 are beveled gears 23 and 24, there being collars 25 fixed upon the revoluble shaft 19, by means of the pins 26, for preventing axial movement of the beveled gears. It is to be noted that the beveled gear 23 meshes with the beveled teeth 12 of the disk 11, while the beveled gear 24 meshes with the teeth 13 of the disk 11. Keyed or feathered upon the revoluble shaft 19 are clutch members 27 and 28. In other words, these clutch members 27 and 28 are capable of rotating with the shaft 19, and are adapted to be shifted thereon, whereby they can be moved into clutching engagement with the beveled gears 23 and 24. Suitable levers 29 and 30 are pivoted at 31 to a part of the auxiliary frame 4, and the forks of these levers pivotally engage lateral lugs 32 of split collars 33, which are mounted in the annular grooves 34 of the hubs of the clutch members 27 and 28. These levers have conventional means, such as hand grip operated dogs 36 and racks 37, for holding the levers in different adjusted positions. The beveled gears 23 and 24 are provided with clutch teeth 38, which are designed to be engaged by the clutch teeth of the clutch members 27 and 28.

It is to be noted that when the hay or the like is in a thin growth, the lever 29 may be oscillated, to throw the teeth of the clutch member 27 in engagement with the teeth 38 of the beveled gear 23, causing the beveled gear 23 and the revoluble shaft 19 to be operated at a low speed, in order to more efficiently cut the hay or the like without clogging or choking the cutter bar.

When the growth of the hay or the like is more or less thick, the clutch member 27 may be moved out of engagement with the beveled gear 23, and then the lever 30 may be manipulated, to move the clutch member 28 in gear with the clutch teeth of the beveled gear 24, and through the medium of the beveled teeth 13 of the disk 11 the shaft 19 will be driven at a high rate of speed, thereby imparting rapid reciprocating movements to the cutter bar, in order to more efficiently and rapidly cut the thick growth of hay.

The invention having been set forth, what is claimed as new and useful is:

1. In a mechanism as set forth, the combination with a frame, of a revoluble drive axle mounted in bearings thereof, a revoluble driven member mounted in bearings of the frame at right angles to the drive axle, a fixed shaft in bearings of the frame, a gear and disk fixed to each other and rotatably mounted upon the fixed shaft and having gear connections with the drive axle, said disk having a plurality of sets of beveled teeth, each set being of a different diameter, a plurality of beveled gears loosely mounted on the revoluble member, one in mesh with one set of beveled teeth and the other in mesh with the other set of beveled teeth, collars fixed on the revoluble member adjacent the opposite faces of the respective beveled gears, to hold the beveled gears at all times in mesh with the teeth, a bearing suspended upon the revoluble drive axle, and in which the revoluble driven member is mounted, said revoluble driven member being inclined downwardly from the fixed shaft under said axle, and corresponding means mounted upon the revoluble member to rotate therewith but shiftable thereon and being singularly shifted into clutch with the faces of the respective beveled gears, whereby the revoluble driven member may be operated at different speeds.

2. In a mechanism as set forth, the combination with a frame, of a driven member mounted in a bearing thereof, a supporting drive axle for the frame and having a supporting drive wheel, a fixed shaft carried by the frame, a disk having a fixed gear thereon and provided with beveled teeth on one face of smaller and greater diameters, a gear fixed to the drive axle and in mesh with the gear of the fixed shaft, a pair of beveled gears loosely journaled upon the revoluble driven member, one meshing with the beveled teeth of a smaller diameter, the other meshing with the beveled teeth of a larger diameter, and clutching means on the revoluble driven member for the respective beveled gears thereof, whereby one or the other may transmit power through the medium of the respective beveled teeth of the disk, to the revoluble driven member, means on the fixed shaft to prevent axial movement of the disk and its gear, and means on the revoluble driven member to prevent axial movement of the loosely journaled beveled gears.

In testimony whereof I hereunto affix my signature in the presence of two witnesses.

HENRY C. SNYDER, JR.

Witnesses:
E. J. KELLY,
CLARENCE HEGARTY.

Copies of this patent may be obtained for five cents each, by addressing the "Commissioner of Patents, Washington, D. C."